United States Patent

[11] 3,602,948

[72] Inventor Daniel Lejeune
Clermont-Ferrand, France
[21] Appl. No. 807,033
[22] Filed Mar. 13, 1969
[45] Patented Sept. 7, 1971
[73] Assignee Compagnie Generale Des Etablissements
Michelin, raison sociale Michelin & Cie
Clermont-Ferrand (Puy-de-Dome), France
[32] Priority Mar. 18, 1968
[33] France
[31] 144,296

[54] VULCANIZATION PRESS
3 Claims, 3 Drawing Figs.
[52] U.S. Cl..................................................... 18/17 K,
18/16 H, 18/30 LA, 18/43
[51] Int. Cl....................................................... B30b 1/34,
B29b 5/02
[50] Field of Search........................................ 18/17 K, 17
M, 17 S, 17 W, 16 H, 16 F, 43, 16 M, 16 E, 2 RM,
30 LA

[56] References Cited
UNITED STATES PATENTS

| | | | |
|---|---|---|---|
| 1,740,065 | 12/1929 | Bostwick............. | 18/17 W |
| 1,778,803 | 10/1930 | Hubbert............. | 18/16 H |
| 1,800,849 | 4/1931 | Stacy................. | 18/16 H |
| 1,801,605 | 4/1931 | Jennejohn........... | 18/17 W |
| 2,115,590 | 4/1938 | Ryder................ | 18/17 M X |
| 2,319,479 | 5/1943 | Ryder................ | 18/30 LA |
| 2,812,543 | 11/1957 | Stacy................. | 18/16 H |
| 2,987,770 | 6/1961 | Powell................ | 18/18 F |
| 3,154,814 | 11/1964 | Fike.................. | 18/18 F |
| 3,310,842 | 3/1967 | Fischbach........... | 18/43 X |

Primary Examiner—J. Howard Flint, Jr.
Attorney—Brumbaugh, Graves, Donohue & Raymond ABSTRACT: A vulcanization press has a fixed frame, a lower, horizontally movable mold plate secured to the frame, and an upper, vertically movable mold plate that can be closed with respect to the lower mold plate. The plates are clamped together in the closed position by a wedge cooperating with inclined thrust blocks, at least one thrust block being connected to each plate.

PATENTED SEP 7 1971 3,602,948

INVENTOR.
DANIEL LEJEUNE
BY
his ATTORNEYS 3,602,948

VULCANIZATION PRESS

BACKGROUND OF THE INVENTION

The present invention relates to vulcanization presses and, more particularly, to novel and highly effective clamping or locking means for the mold plates of vulcanization presses used in making tires.

The principal force required to operate a vulcanization press used in making tires is that which must be exerted in order to keep the mold tightly closed during vulcanization. The pressure of the fluid (for example, air, steam or water) used to keep the press closed during vulcanization of the tire produces a considerable resultant force—about one hundred tons in case of heavy-duty—which tends to cause separation of the mold plates. In automatic presses, the mold plates are generally pressed against each other by means of very powerful mechanical or hydraulic elements which are able to withstand the vulcanization pressure and frequently also accomplish the functions of opening and closing the mold. As a result, the automatic presses, especially those used to vulcanize heavy-duty tires, are massive and cumbersome machines with movable mechanical parts that must generate and transmit considerable forces.

SUMMARY OF THE INVENTION

An object of the present invention is to provide an opening-closing and locking-unlocking system for vulcanization presses which facilitates a very considerable reduction of the mass of the machinery and of the forces generated in the press without diminishing its automatism. Another object of the invention is to facilitate the automatic adjustment of the height of the mold and a great variety of combinations in the movements of the mold-carrying plates during opening and closing of the mold.

The foregoing and other objects of the invention are attained, in a representative embodiment thereof, by the provision of a vulcanization press having a first, lower, horizontally movable plate and a second, upper, vertically movable plate. The upper and lower plates support the parts constituting the mold. The locking or clamping and the pressing of the two plates against each other are ensured by wedge means actuated by any suitable motive means, such as a hydraulic jack or a translating screw. The wedge is mounted for insertion between a fixed thrust block which is integral with the frame and connected to one of the plates and at least one movable thrust block connected to the other plate.

The structure is preferably characterized by the following features, separately or in combination:

a. The bearing surfaces of the wedge and of the thrust blocks are all inclined in relation to the direction of movement of the wedge.

b. The angle of inclination of the various bearing surfaces is sufficiently small in relation to the coefficient of friction between the surfaces that the clamping or locking produced by the wedge is self-holding, the unlocking requiring positive actuation.

C. The movable thrust blocks can slide vertically as well as pivot and are connected to axles traversing slots formed in the frame.

d. The movable thrust blocks, preferably two per wedge, are integral with arms the tilting of which from rest positions is produced by the wedge. When the wedge is out of contact with the arms, they are tilted to a rest position by biasing means. On approaching each other, teeth on the arms engage corresponding teeth on opposite sides of an arm integral with or connected to one of the plates.

e. The engaging teeth distribute the fastening action over a greater area and facilitate locking at different levels, depending on the height of the mold.

f. The opening and closing of the mold are controlled by actuating means, for example hydraulic jacks, facilitating a vertical translation movement of the upper plate in relation to the frame of the press and the lower plate.

g. The lower plate is likewise capable of a translation motion, preferably in a horizontal direction, in relation to the frame, whereby such motion can be combined, if desired, with the movement of the upper plate or proceed independently as desired, in order to facilitate insertion and removal of the tire.

BRIEF DESCRIPTION OF THE DRAWING

An understanding of additional aspects of the invention may be gained from a consideration of the following detailed description of a representative embodiment thereof, in conjunction with the accompanying figures of the drawing, wherein.

DESCRIPTION OF THE PREFERRED EMBODIMENTS

Figure 1:
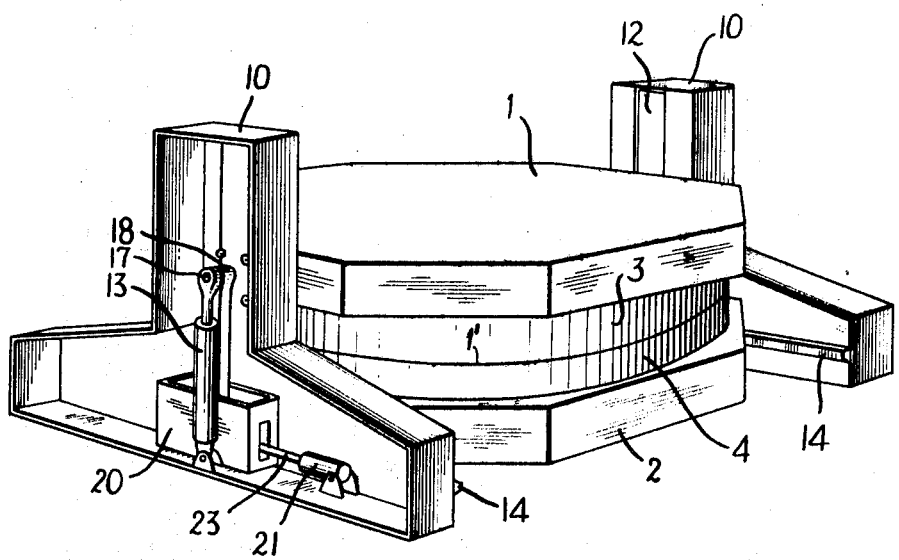
FIGS. 1 and 2 are perspective views of a representative embodiment of a press assembly in accordance with the invention, the press being shown closed in the first figure and open in the second one.
Figure 2:
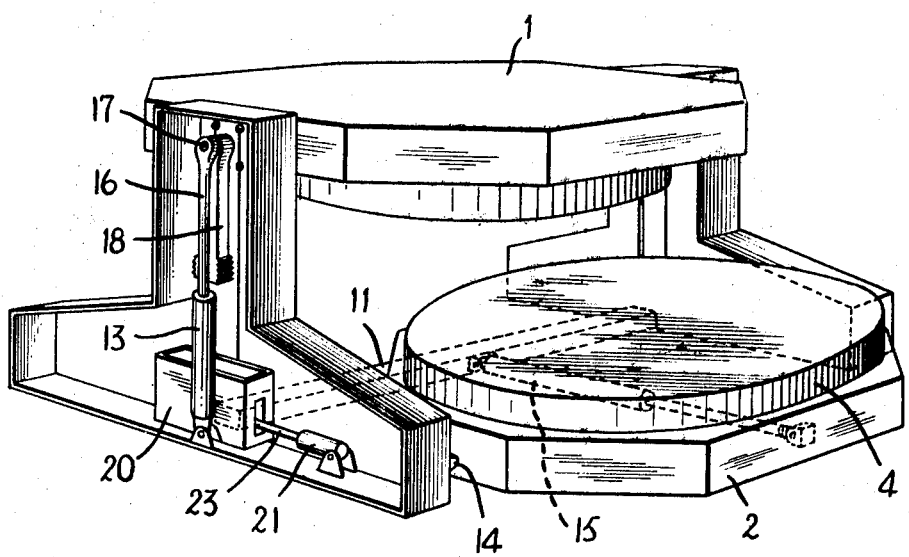

In FIGS. 1 and 2, 1 indicates the upper plate and 2 the lower plate of a vulcanization press. These plates carry or include, respectively, the upper part 3 and lower part 4 of a mold shown diagrammatically. The mold may be of any kind whatever. Specifically, it may comprise an incorporated heating circuit; or, heating may be produced by a steam or electric circuit within the press or by an independent and removable steam or electric circuit. The molding device may be of the section type or of the die-cast type in one piece.

The plates 1 and 2 are carried by two columns 10 forming the frame of the press. The columns 10 are connected at their bases by a crosspiece 11. The upper plate 1 slides vertically along guide means 12 provided in each of the columns 10. The upper plate 1 can be lifted by lifting jacks 13 mounted in the frame. The lower plate 2 can also slide but does so horizontally along guide means 14. The lower plate 2 is propelled by a hydraulic jack 15 supported by the crosspiece 11.

The rods 16 of the jacks 13 are mounted on axles 17 integral with the upper plate 1. Arms 18 are mounted on the same axles. They are part of the clamping and locking mechanism housed in a box 20 and also in a similar box placed in the other column 10. A jack 21 on each side of the press ensures the functioning of the clamping and locking system to secure the lower and upper parts together along a plane of contact 1'.

The means controlling the jacks 13, 15 and 21 are conventional and well known to those skilled in the art and so have not been shown. They facilitate the execution of the different possible operating cycles of the press in accordance with any desired program.

Figure 3:
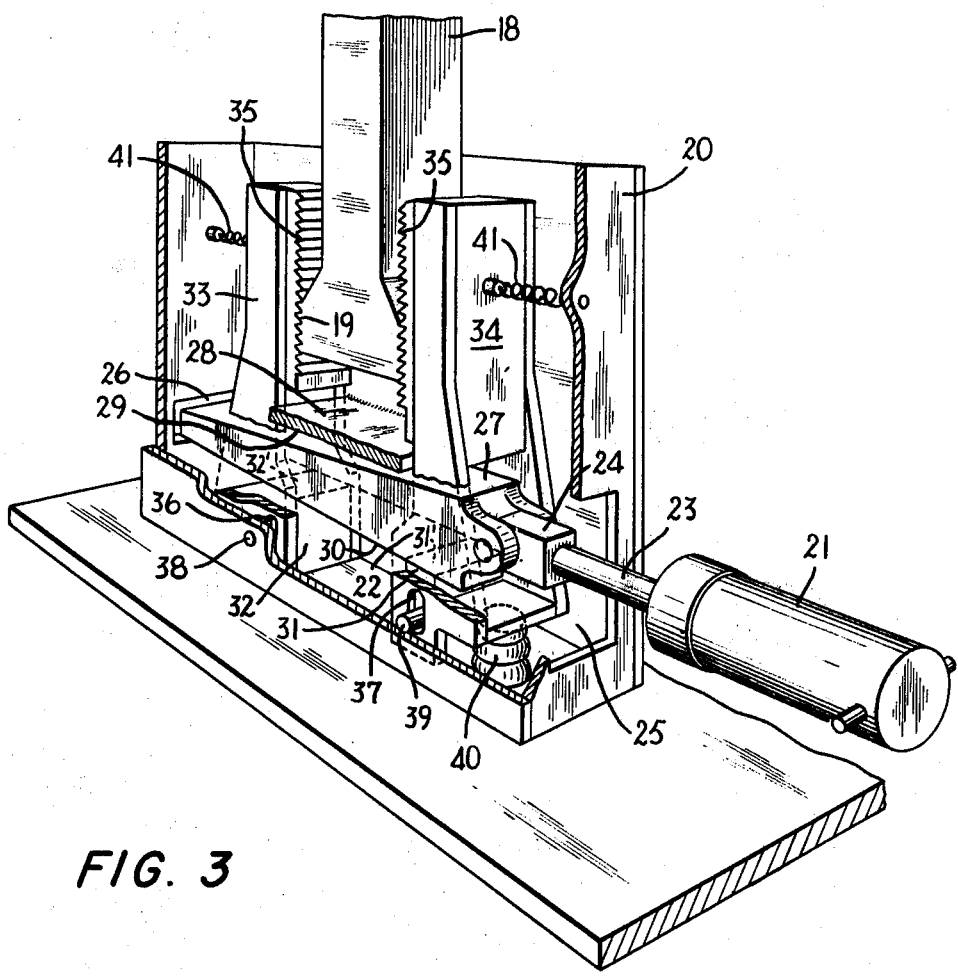
FIG. 3 is a perspective view, partly broken away and on a larger scale, of a portion of the apparatus of FIGS. 1 and 2.

FIG. 3 shows the clamping and locking mechanism in detail.

The box 20, shown partly broken away, is integral with the base of the column 10 and contains the mechanism. The lower end of the arm 18 is provided with sawtooth notches or teeth 19.

The box 20 is traversed by a wedge 22 which can be pushed or pulled by the jack 21 by means of a rod 23 and a joint 24. The wedge 22 passes through the box 20 which is accordingly provided on opposite sides with openings 25 and 26. The wedge 22 has an upper bearing surface 27 which is inclined with respect to the horizontal plane and is adapted to engage the lower surface 29 of a fixed thrust block 28. The surface 29 is inclined in relation to the horizontal plane complementally to the surface 27 so as to be parallel thereto. The thrust block 28 is integral with the box 20 and the crossbeam 11.

The wedge 22 likewise has a lower bearing surface 30 inclined symmetrically with respect to the surface 27 about the horizontal plane. The surface 30 is adapted to engage two thrust blocks 31 and 32 the bearing surfaces 31' and 32' of which are parallel to the surface 30.

The thrust blocks 31 and 32 are respectively integral with jaws or arms 33 and 34 provided with the racks or teeth 35 capable of meshing with the teeth 19 of the arm 18. The thrust blocks 31 and 32 and the jaws 33 and 34 can slide and pivot in the box 20 thanks to grooves 36 and 37 traversed by axles 38 and 39 carried by the box 20. Elastic blocks 40 support the jaws 33 and 34. In the absence of any strain capable of bringing them closer to each other, the jaws are kept separated by tension springs 41 which tend to tilt them in the direction of the lateral walls of the box 20 until they attain a rest position resulting from the equilibrium of the spring 41, in which rest position they are out of engagement with the teeth 19.

The clamping system functions as follows:

When the wedge 22 is not engaged with the fixed thrust block 28 and the movable thrust blocks 31 and 32, the jaws 33 and 34, pulled back by the springs 41, are separated, and the teeth 19 of the arm 18 are disengaged from the racks 35. Since the arm 18 is disengaged, the plate 1 can be freely lifted or lowered.

To close the press, one first lowers the plate 1 until it comes into contact with the plate 2 and then actuates the jack 21 which advances the wedge 22. The wedge 22, which first engages the thrust block 31 and then the thrust block 32, causes tilting of the jaws 33 and 34 towards each other and of the thrust blocks 31 and 32 until the teeth 19 mesh with the racks 35. As the movement of the wedge 22 continues, its upper surface 27 comes into contact with the thrust block 28. At this point clamping is accomplished. However, the advance of the wedge 22 is continued to the desired degree of locking. It is advisable to compress the plates 1 and 2 against each other with a preliminary stress sufficient to counteract subsequent deformation due to the vulcanization pressure. This prevents loss of tightness. The clamping system in accordance with the invention makes it possible to obtain sufficient locking by making use of hydraulic jacks of comparatively small power, especially in view of the long path the wedges 22 can travel and the comparatively small angle that can be provided between the surfaces 27 and 30 (and the corresponding small angle between the surface engaged by the surface 27 and the surfaces engaged by the surface 30). The power employed is considerably lower than the power used if, for example, the jacks 13 ensure the locking. Furthermore, in the latter case, maintenance of locking during curing requires maintaining the pressure in the jacks 13 during the entire curing period, whereas the jacks 21 are used only to move the wedges 22. Once these are in locking position, they are self-holding because of the angle referred to above being chosen to be sufficiently small with respect to the coefficient of friction between the bearing surfaces. There is thus no possibility of a spontaneous or accidental unlocking movement.

It is evident that the clamping system functions regardless (within wide limits) of the level of the arm 18 when the plate 1 and the upper part 3 of the mold rest on plate 2 and the lower part 4 of the mold and regardless (within wide limits) of the height of the mold. The wedge 22 takes up the play and brings the engaging teeth together for all heights of the mold (within wide limits). At the same time it provides energetic clamping and locking.

It is an advantage of the clamping system in accordance with the invention that it leaves any desired latitude for displacement of the plates, especially in the vertical direction for the upper plate and in a horizontal direction for the lower plate, and does so by making use of little power. All that is required is the balancing of the forces of gravity or friction. Specifically, it becomes possible to program the movements of the two plates during the opening procedure of the mold so as to facilitate the removal of the tire. Thus, in a first stage, the upper plate can be slightly lifted, then the lower plate can be displaced horizontally in order to detach the tire from the mold, and, finally, one can open the mold widely in order to remove the tire. These movements can be carried out easily since the various factors (clamping and locking, lifting, translation) have become separate and since the principal function (locking) is ensured while the means ensuring it does not limit the functioning of the means ensuring other operations.

A further advantage of the system of closing and clamping in accordance with the invention is that it diminishes the number and importance of the parts subject to considerable force or having to be machined with precision.

Thus there is provided in accordance with the invention novel and highly effective molding apparatus permitting the use of lighter (and hence less expensive) machinery than that heretofore required. Many modifications in form and detail of the representative embodiments described above will readily occur to those skilled in the art. For example, the axles 38 and 39 can be rigid with respect to the box 20 and the slots 36 and 37 formed in the thrust blocks 32 and 31. Accordingly, the invention is to be construed as including all of the embodiments thereof within the scope of the appended claims.

I claim:

1. A vulcanization press comprising a fixed frame, a first mold plate secured to said frame, a second mold plate movably mounted with respect to said first plate, and clamping means for pressing said plates together, said clamping means comprising fixed thrust block means mounted in stationary relation to said frame, movable thrust block means connected to said second mold plate and movable with respect to the fixed thrust block means, wedge means mounted for engaging movement whereby said thrust block means are engaged by said wedge means and relatively moved to clamp said mold plates tightly together and for disengaging movement whereby said wedge means is disengaged from said thrust block means to permit opening of said mold plates, and motive means for actuating said wedge means, said movable thrust block means comprising two movable thrust blocks and said clamping means further comprising a mold plate arm secured to said second mold plate, teeth formed on opposite sides of said arm, a pair of thrust block arms, one secured to each of said movable thrust blocks, teeth on each of said thrust block arms, said mold plate arm teeth extending between said thrust block arm teeth for engagement thereby when said wedge means is actuated to clamp said mold plates together said thrust block arms being mounted for pivotal and sliding movement, further comprising biasing means connected to said thrust block arms for pivoting said thrust block arm teeth out of engagement with said mold plate arm teeth when said wedge means is disengaged from said thrust block means, said wedge means when actuated to clamp said mold plates together overcoming said biasing means and pivoting said thrust block arm teeth into engagement with said mold plate arm teeth and further translating said thrust block arms and thrust blocks to effect said clamping of said mold plates.

2. A press according to claim 1 wherein said mold plate arm teeth are engageable with said thrust block arm teeth at different locations of said mold plate arm.

3. A press according to claim 1 wherein a plurality of said mold plate arm teeth on each side of said mold plate arm are respectively engageable with a plurality of the teeth on each of said thrust block arm teeth, whereby the engagement of said mold plate arm teeth and said thrust block arm teeth is distributed over a greater area.